(12) United States Patent
Swank

(10) Patent No.: US 10,207,355 B2
(45) Date of Patent: Feb. 19, 2019

(54) WELDING ELECTRODES AND METHODS OF MANUFACTURING SAME

(71) Applicant: LUVATA OHIO, INC., Delaware, OH (US)

(72) Inventor: Brian E. Swank, Galena, OH (US)

(73) Assignee: LUVATA OHIO, INC., Delaware, OH (US)

(*) Notice: Subject to any disclaimer, the term of this patent is extended or adjusted under 35 U.S.C. 154(b) by 373 days.

(21) Appl. No.: 15/040,398

(22) Filed: Feb. 10, 2016

(65) Prior Publication Data

US 2017/0225261 A1 Aug. 10, 2017

(51) Int. Cl.
| | |
|---|---|
| *B23K 11/30* | (2006.01) |
| *B21C 23/24* | (2006.01) |
| *B22D 7/00* | (2006.01) |
| *B22D 11/00* | (2006.01) |
| *B22F 7/08* | (2006.01) |
| *B23K 35/30* | (2006.01) |
| *B23K 35/40* | (2006.01) |

(Continued)

(52) U.S. Cl.
CPC ............. *B23K 11/30* (2013.01); *B21C 23/24* (2013.01); *B21C 33/002* (2013.01); *B21C 33/004* (2013.01); *B21C 37/045* (2013.01); *B22D 7/005* (2013.01); *B22D 11/004* (2013.01); *B22D 11/006* (2013.01); *B22F 7/08* (2013.01); *B23K 11/3009* (2013.01); *B23K 20/021* (2013.01); *B23K 20/227* (2013.01); *B23K 20/233* (2013.01); *B23K 35/0205* (2013.01); *B23K 35/0261* (2013.01); *B23K 35/302* (2013.01); *B23K 35/40* (2013.01); *B23K 35/402* (2013.01); *B23K 35/406* (2013.01); *B23K 2101/38* (2018.08); *B23K 2103/12* (2018.08); *B23K 2103/22* (2018.08)

(58) Field of Classification Search
CPC .... B23K 11/30; B23K 35/302; B23K 35/406; B23K 35/402; B23K 35/0205; B23K 20/233; B23K 2101/38; B23K 2103/22; B23K 2103/12; B23K 11/3009; B21C 23/24; B22D 7/005; B22D 11/004; B22D 11/006; B22D 7/08
USPC ...................................................... 219/119
See application file for complete search history.

(56) References Cited

U.S. PATENT DOCUMENTS 3,909,581 A * 9/1975 Stone ................. B23K 11/3009
 219/119
4,071,947 A 2/1978 Nippert
(Continued)

FOREIGN PATENT DOCUMENTS

JP H0976074 A 3/1997

*Primary Examiner* — Brian W Jennison
(74) *Attorney, Agent, or Firm* — Hodgson Russ LLP

(57) ABSTRACT

The present disclosure provides a welding electrode and methods of manufacturing the same. The welding electrode can include a composite body having a tip portion and an end portion. The composite body can include a shell defining a cavity through the end portion, the shell comprising a first metal that includes one or more of the following: a precipitation hardened copper alloy, copper alloy, and carbon steel. The composite body can also include a core within the shell, the core extending through the shell from the tip portion to the cavity, the core comprising a second metal that includes dispersion strengthened copper. The core and the shell have a metallurgical bond formed from co-extrusion.

20 Claims, 14 Drawing Sheets

(51) Int. Cl.
 *B21C 37/04* (2006.01)
 *B23K 20/02* (2006.01)
 *B23K 20/227* (2006.01)
 *B23K 20/233* (2006.01)
 *B21C 33/00* (2006.01)
 *B23K 35/02* (2006.01)
 B23K 101/38 (2006.01)
 B23K 103/12 (2006.01)
 B23K 103/22 (2006.01)

(56) References Cited

U.S. PATENT DOCUMENTS

| | | |
|---|---|---|
| 4,345,136 A | 8/1982 | Nippert |
| 4,588,870 A * | 5/1986 | Nadkarni ........... B23K 35/0205 |
| | | 219/118 |
| 5,030,275 A | 7/1991 | Samal et al. |
| 2005/0092728 A1* | 5/2005 | Barbeau ............. B23K 11/3018 |
| | | 219/229 |

* cited by examiner

WELDING ELECTRODES AND METHODS OF MANUFACTURING SAME

FIELD OF THE DISCLOSURE

The disclosure generally relates to the field of composite wires and, in particular, composite wires used to manufacture resistance welding electrodes.

BACKGROUND OF THE DISCLOSURE

Dispersion Strengthened Copper ("DSC") is typically supplied in extruded and drawn shapes including rounds, rectangles, wire, plates, tubes, and rolled strip. DSC is a thermally stable copper, which retains a high percentage of its strength at elevated temperatures. DSC does not recrystallize or soften after exposure to temperatures approaching the melting point of copper. Since DSC uses inert aluminum oxide particles to strengthen the copper matrix, the thermal conductivity of the copper is not significantly decreased.

DSC is used for applications requiring electrical and thermal conductivity near that of pure copper, while maintaining strength and resistance to softening at elevated temperatures. The commercial applications for DSC include resistance welding electrodes, incandescent lamp lead wires, diodes, X-Ray and microwave tube components, high temperature contacts and particle accelerator components. DSC resistance welding electrodes offer improved life due to reduced weld tip surface softening and non-sticking properties when welding coated steels.

The "canister method" is an example of DSC manufacturing, which begins with a canister made of pure copper. The canister is cleaned with an acid or alkaline cleaner to remove machining lubricants or any oxides from the surface. DSC powder is then placed into the canister to achieve a fill factor of between 50 to 55 percent. The canister can then be purged with nitrogen if desired and evacuated and sealed. This process of evacuating the canister creates a vacuum inside the canister to eliminate trapped gas and minimize expansion during preheating of the canister powder prior to extrusion. Heat can also be applied to the canisters during filling while creating the vacuum to remove any trapped moisture in the assembly. Once the vacuum has been established and moisture removed the canister is then sealed. After sealing the canister the assembly is referred to as a billet. The billet containing DSC powder is formed into rod by first preheating the billet to a given temperature and then extruding. Since the wall thickness of the canister is small (for example, less than 5 millimeters), a typical DSC rod may have a cross section of 92% DSC.

The drawbacks to the canister method include: fabrication of a pure copper canister that adds no additional functional benefit to the final product, limited fill factor of powder into the canister creating low yields, the time required to evacuate a canister, increased heating time to heat an assembly prior to extrusion due to the separation between powder particles that reduces conduction heating, and an amount of DSC needed for the end product due to the small wall thickness.

The fill factor (actual weight of powder/theoretical full density weight for the given volume) of DSC powder and evacuation of the canister affects quality of the DSC rod. Consequently, other methods, such as Hot Isostatic Pressing ("HIP") or Cold Isostatic Pressing ("CIP") have been used to consolidate DSC powder into billets that are then extruded into a rod. These methods rely upon fluid pressure to increase the density of DSC. However, HIP and CIP have extreme costs associated with their operation. In particular, estimated cost per HIPing load using a large Quintus chamber would be $7,000 to $8,000 and having the capacity for 7 k to 11 k pounds of DSC billets. This would equate to approximately $0.833/lb. and would require a 24-hour cycle. The cost for CIPing is approximately $500 per item and takes approximately one hour to complete. The estimated cost for CIPing a DSC billet would be $2.00/lb. In contrast, the cost of the canister method can be between $250-$500 per item. Additionally, a disadvantage to HIP is that the assembled canisters containing DSC powder need to be heated to remove moisture, crimp sealed and welded, leak tested, and then HIPed. For powder the main obstacles related to HIPing is that the fill factor must be greater than 50% prior to HIP. If the fill factor is less than 50% then the powder must be CIPed prior to being placed into a canister.

One use of DSC is in resistance welding electrodes. Resistance welding has long been used as a quick and effective method of joining metal members. The workpieces to be welded are placed in abutting relationship and a large current is caused to flow through the workpieces by a pair of opposed electrodes. The current causes the abutting surfaces of the workpieces to be heated sufficiently to effect the formation of a weld nugget. Typically, the electrodes apply significant pressure to the workpieces during welding. This facilitates the welding process by urging the material together and, also, reducing electrical resistance between each electrode tip and the adjacent workpiece material.

Since welding is accomplished by resistance heating of the material being welded, it will be appreciated that the electrodes will also be heated substantially. It is important to have an electrode of high electrical conductivity in order to minimize the power loss in the electrode and the resulting heating of the electrode.

Over time, the repeated heating and pressing operations involved in resistance welding cause breakdown, softening, mushrooming and other deformation of the electrodes. As this occurs, electrical current requirements increase with the enlarged welding tip face contacting the workpiece material until ultimately, redressing or replacement of the electrode is required. Accordingly, it is also important to have an electrode which is capable of withstanding significant distorting force at the elevated temperatures which result from the welding process so as to minimize the number of times it becomes necessary to redress or replace the electrode within a given period of time.

It is known in the art to form resistance welding electrodes by combining a copper electrode body with an anneal resistant high hardness insert. Typically, the insert performs much better than the copper material from which the electrode body was formed. However, the insert material is much more expensive than the copper used to form the electrode body.

The insert may be brazed onto the shank. The brazing step is disadvantageous as it adds an additional step to the electrode manufacturing process and, hence, increases the cost of the electrode. Furthermore, the brazing operation may anneal and soften the electrode body.

It is also known to force the insert into an electrode body via a press-fit operation. The steel welded today is often galvanized, or coated with a zinc or other softer metal coating. As a result, the resistance welding electrodes tend to stick to the coated metal. An electrode tip joined to an electrode body via a press-fit operation may pull out of the shank during resistance welding of coated materials, thus requiring replacement of the electrode.

BRIEF SUMMARY OF THE DISCLOSURE

The present disclosure provides a welding electrode. The welding electrode can include a composite body having a tip portion and an end portion. The composite body can include a shell defining a cavity through the end portion, the shell comprising a first metal that includes one or more of the following: a precipitation hardened copper alloy, copper alloy, and carbon steel. The composite body can also include a core within the shell, the core extending through the shell from the tip portion to the cavity, the core comprising a second metal that includes dispersion strengthened copper. The core and the shell have a metallurgical bond formed from co-extrusion.

The present disclosure also describes method of manufacturing a composite material. A composite metal wire having a first end and a second end can be provided, the composite wire including a core and a shell surrounding the core, the core and the shell having a metallurgical bond formed from co-extrusion. The wire can be deformed into a first shape such that the first end forms a rounded tip having a truncation. The wire can be deformed from the first shape into a second shape such that a cavity is formed in the second end. Deforming the wire from the first shape into the second shape can push the core from the second end toward the first end. The shell can include one of the following: a precipitation hardened copper alloy and carbon steel. The core can comprise dispersion strengthened copper.

The disclosure also describes a method of manufacturing a composite material. The method can include compacting a copper alloy powder into a plurality of substantially uniform compressed sub-assemblies such that the copper alloy powder has a density that is greater than 50%. The density of the copper alloy powder may be greater than 65%. The plurality of compressed sub-assemblies can be layered relative one another within an aperture of a shell, the plurality of compressed sub-assemblies forming a consecutive assembly of compacted copper alloy. The shell may include one of the following: a precipitation hardened copper alloy, copper alloy, and carbon steel. In a specific embodiment, shell is made of CuZr. The powder may be dispersion strengthened copper. A layer of un-compacted copper alloy powder may also be added to the shell, with the plurality of compressed sub-assemblies layered on top. The compressed sub-assemblies may be thermally heat treated prior to layering within the shell. The consecutive assembly can be sealed within the shell to form a billet. Before the consecutive assembly is sealed, it may be purged with nitrogen. The purging may further include heating above the ambient temperature, even to a temperature above 900° C. The billet can be hot-extruded to form a rod, and the extruded rod can be further drawn to form a composite wire of a desired diameter.

The present disclosure further describes a welding electrode. The electrode may comprise a composite body having a tip portion and an end portion. The composite body may include a shell defining a cavity through the end portion. The shell may comprise a first metal that includes precipitation hardened copper alloy, copper alloy, or carbon steel. The shell may further comprise a core within the shell, the core extending through the shell from the tip portion to the cavity. The core may comprise a second metal that includes dispersion strengthened copper. The core and shell may have a metallurgical bond formed from co-extrusion. The shell may be made solely of CuZr and the core made be made solely from dispersion strengthened copper. The core may have a diameter that is 6-8 mm at the tip portion of the body, or the diameter of the core may be approximately 6-8 mm throughout the welding electrode. The diameter of the core may be substantially uniform from the tip portion of the electrode or the majority of the length of the core may have a diameter that is substantially uniform with a minority length of the diameter that tapers outwardly as the core meets the cavity. The cavity of the electrode may be sized and configured to be received by a robotic welder. The cavity may be tapered inwardly from the end portion to the core. The tip portion may have a cross-sectional shape of a truncated parabolic or elliptical curve. The core may have an axial length and the shell has an axial length, where the axial length of the core may be about half the axial length of the shell. The shell may have an outer diameter that is approximately 0.600-0.650 inches and an inner diameter that is approximately 0.420-0.480 inches, which forms an outer wall of the cavity.

The present disclosure further comprises a method of manufacturing a composite material. The method can include providing a composite metal wire having a first end and a second end, a core and a shell surrounding the core where a metallurgical bond is formed between the shell and core from co-extrusion. The composite metal wire may be cylindrical and the core may extend from the first end to the second end of the composite metal wire. The composite wire may be deformed into a first shape such that the first end forms as rounded tip having a truncation, and further deformed from the first shape into a second shape in which a cavity is formed in the second end. The step of deforming the wire into the first shape may lengthen the wire. The deforming step from the first shape to the second shape may involve pushing the core from the second end toward the first end. The step of deforming the wire from the first shape into the second shape may lengthen the wire. In the second shape, the core may have an axial length and the shell has an axial length, where the axial length of the core may be about half the axial length of the shell. The shell may comprise precipitation hardened copper alloy or carbon steel and the core may comprise dispersion strengthened copper. The shell may be made solely of CuZr and the core made be made solely from dispersion strengthened copper.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
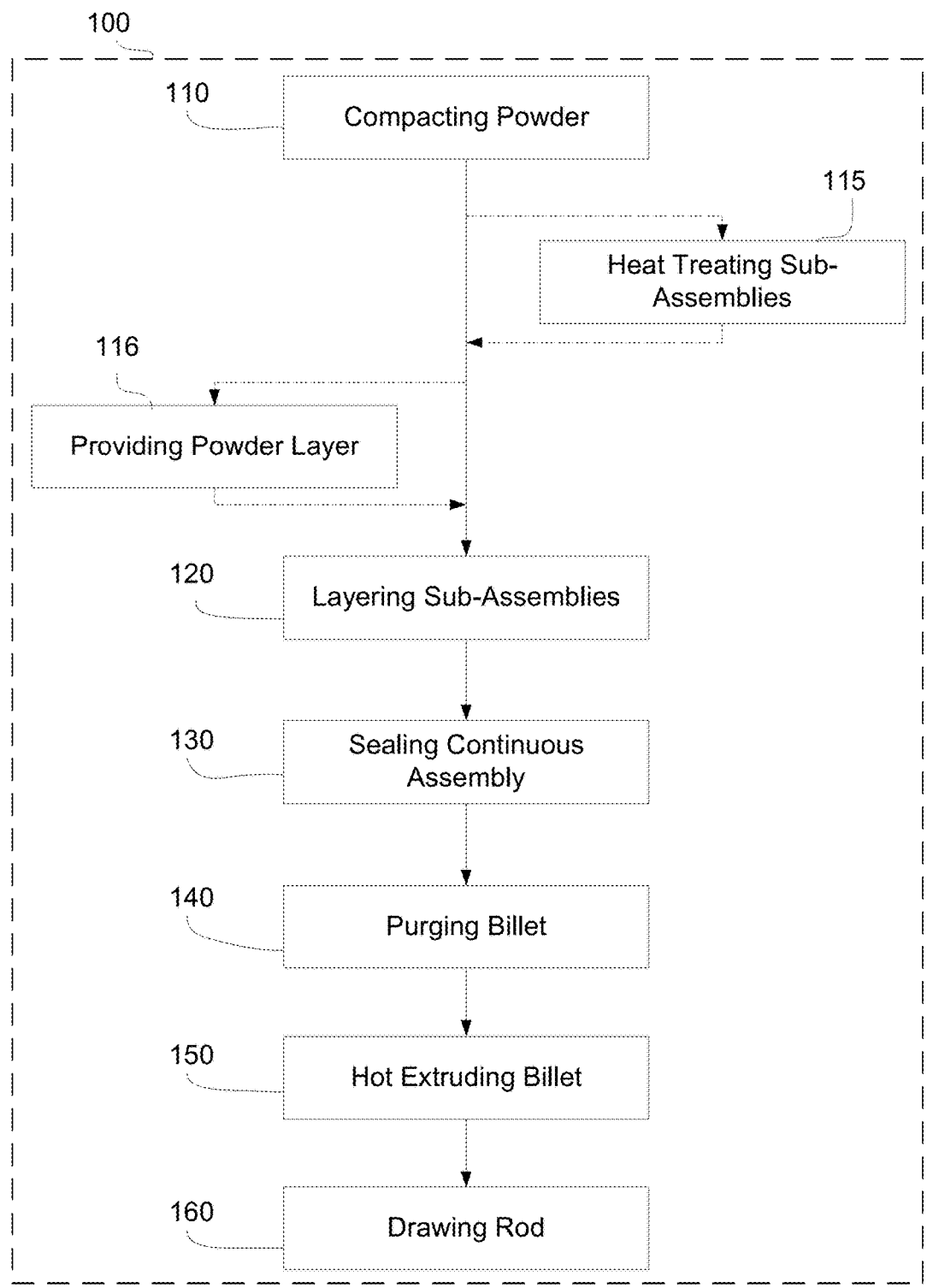
FIG. 1 is a flow chart of method of producing an extruded rod.

Referring to FIG. 1, the present disclosure provides a method 100 of manufacturing a composite material. The method 100 can include compacting 110 a copper alloy powder into a plurality of substantially uniform compressed sub-assemblies such that the copper alloy powder can have a density that is greater than 70%, 75%, 80%, or 85% according to certain embodiments of the present disclosure. The plurality of compressed sub-assemblies can be layered 120 relative one another within an aperture of a shell, the plurality of compressed sub-assemblies to form a consecutive assembly of compacted copper alloy. The consecutive assembly can be sealed 130 within the shell to form a billet. The billet can be purged 140 with gas, and hot extruded 150. The extruded billet is used to draw 160 a composite material.

Figure 2:
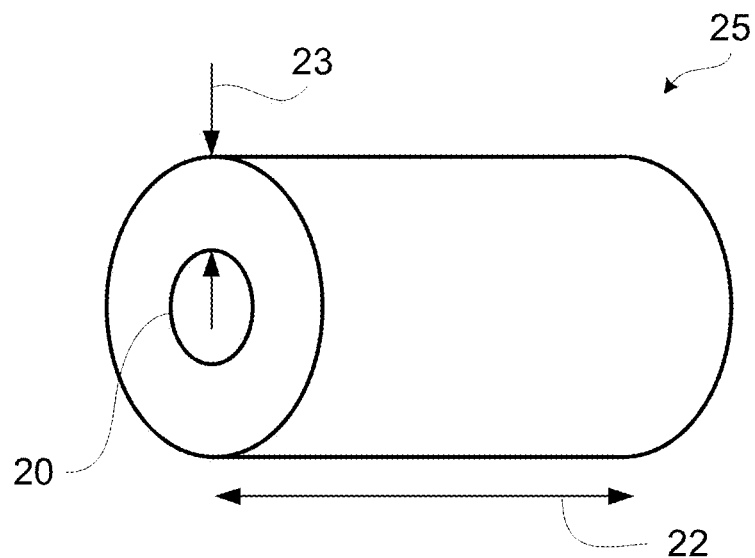
FIG. 2 is a schematic drawing of a shell.

FIG. 2 shows an exemplary shell 25 that may be used in accordance with the method 100. The shell 25 may be the product of various fabrication methods. For example, the shell may be cast by: continuous casting of a hollow cross section, continuous casting of a solid billet, sand casting, vacuum casting, or billet casting. To form the shell 25, methods may include machining of the inner diameter from a solid billet, back extruding the inner diameter from a solid billet, or inserting and welding a plug into a hollow cross section. The wall thickness 23 of the shell 25 may be extruded, machined, or cast to a desired thickness. For some applications the wall thickness 23 may be minimal (for example, a minimum of about 2 mm), while others may require a wall thickness 23 that covers up a substantial portion of the cross section (for example, a maximum of about 5 mm). It may be desired to reduce the amount of copper alloy required for the core, so the core may make up no more than 25% of the cross section. The shell 25 may further be cleaned to remove any impurities left behind by the fabrication process, for instance, an acid dip. The shape of the shell 25 can be a hollow cylindrical or prismatic volume with a cavity that includes an aperture 20 on one face and extends a substantial length of the shell 25. In a specific embodiment, the thickness 23 is 52.5 mm and the length 22 is 470 mm. The shell 25 may be formed of one or more of the following materials: a precipitation hardened copper alloy, copper alloy, or carbon steel.

In order to increase the fill factor of DSC, the method 100 can include compressing DSC powder into a plurality of compressed sub-assemblies 15. This process can begin by forming the DSC powder 10 using internal oxidation or mechanical milling techniques. Once the DSC powder 10 is produced, a gravimetric or volumetric method may be used to obtain a predetermined amount of powder to produce a specific size sub-assembly 15. The predetermined amount of powder may be compacted 110 using a mechanical or hydraulic press to create a sub-assembly 15 of a density greater than 70%. In one embodiment, the powder density of the sub-assemblies may be 85%. Depending on the quality of the powder 10, the compacted sub-assemblies 15 may be also thermally heat treated 115. This may be performed using hydrogen to remove any moisture, residual lubricants from the pressing operation, or residual copper oxides.

Figure 3:
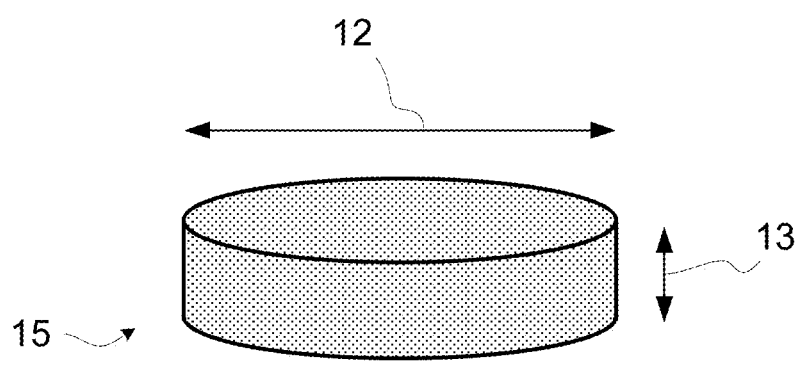
FIG. 3 is a schematic drawing of a compressed sub-assembly.

FIG. 3 depicts an exemplary sub-assembly that may be used according to the method 100. However, the shape of the compacted sub-assemblies 15 can change depending on the desired fit within the aperture 20 of the shell 25. Examples of sub-assembly 15 shapes include cylindrical and prismatic volumes. In the embodiment shown in FIG. 3, the shape of the shell 25 is cylindrical such that the shape of the compressed sub-assembly 15 is also cylindrical, with a thickness 13 and diameter 12 that complements the aperture 20 diameter of the shell 25. In certain embodiments, the thickness 13 can range from 25-50 mm and diameter 12 can range from 70-200 mm. In a specific embodiment, the thickness 13 is 25.5 mm and the diameter 12 is 100.3 mm.

In one particular embodiment, the shell 25 can be made of CuZr, and the powder 10 be DSC. The density of the DSC powder 10 can be greater than 65%. The compressed sub-assemblies 15 are thermally heat treated 115 prior to being layered 120 within the shell 25. For the intended application, the shell 25 material chosen was a precipitation hardened copper alloy. Since the shell material is only used as a device to contain the DSC, any copper or nonferrous alloy compatible with the extrusion temperature and having similar elongation properties to that of the DSC may be selected. Carbon steel may also be selected.

Figure 4:
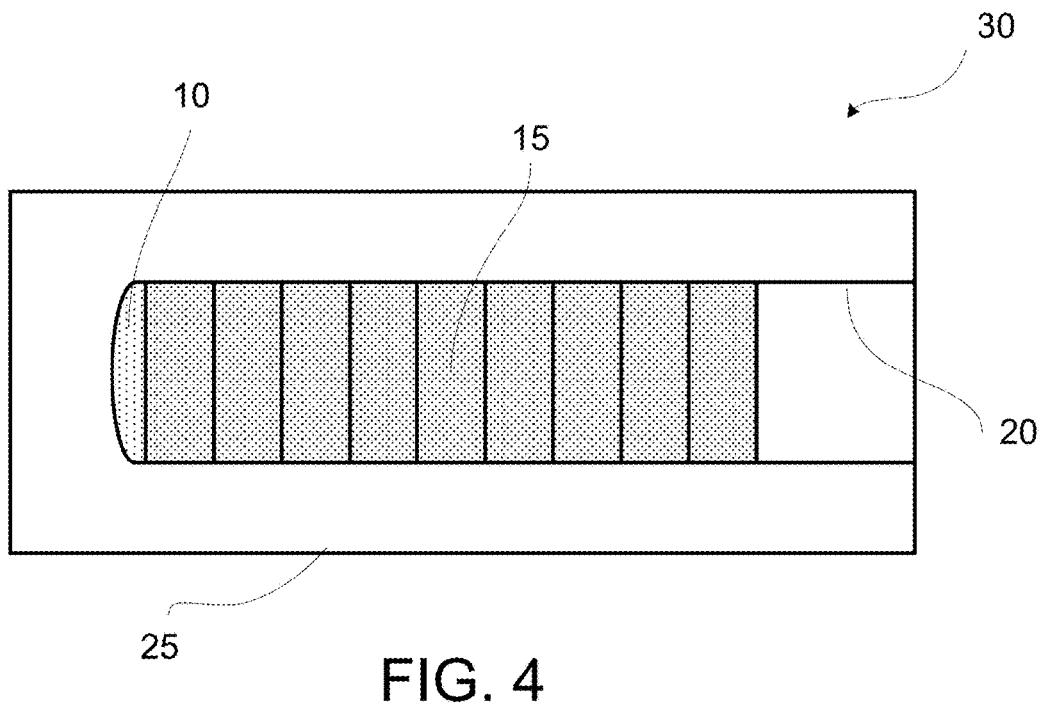
FIG. 4 is a schematic drawing of a consecutive assembly.

As shown in FIG. 4, a layer of un-compacted copper alloy powder 10 may be provided 116 in the shell if it was produced using back extrusion or machining. This may compensate for any surface irregularities or air gaps from machining or extrusion contours. Compressed sub-assemblies 15 are layered 120 within the aperture 20 of the shell 25, with each sub-assembly 15 in contact with the faces of the adjacent layers. The number of sub-assemblies 15 that comprise the plurality is dependent on the thickness 13 of each sub-assembly and the length 22 of the shell 25 used. The number of sub-assemblies 15 may be relatively large if the thickness 13 of each sub-assembly 15 is relatively short and the length 22 of the shell 25 is relatively long, and the number of sub-assemblies 15 may be relatively small if the thickness 13 of each sub-assembly 15 is relatively long and the length 22 of the shell 25 is relatively short.

Figure 5:
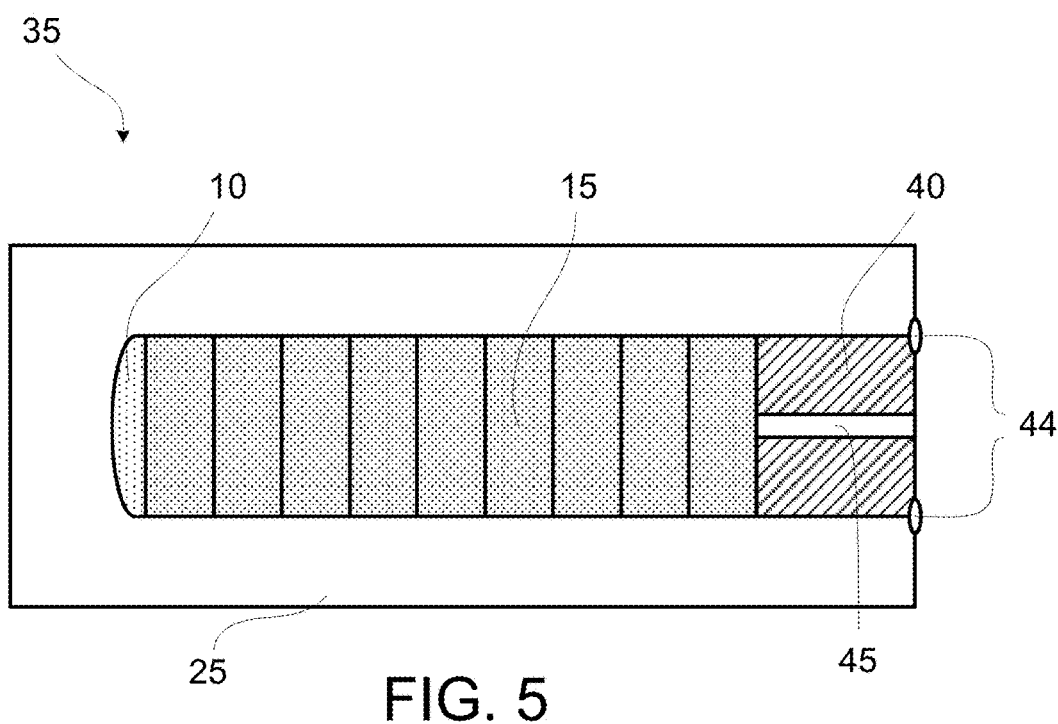
FIG. 5 is a detailed view of fully assembled billet.
Figure 6:
FIG. 6 is a photograph of prototype shells and a cap.
Figure 7:
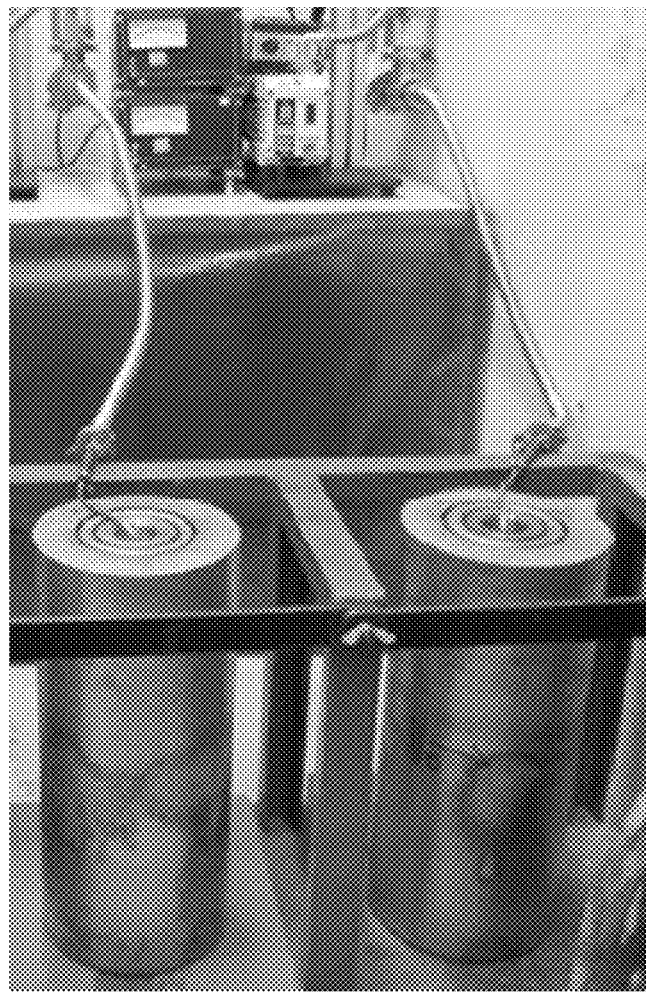
FIG. 7 is a photograph of prototype billets during a purging process.

This consecutive assembly 30 of FIG. 4 is sealed 130 and purged 140 with nitrogen. Sealing 130 involves installing a cap 40 on top of the plurality of sub-assemblies 15 within the aperture 20 of the shell 25 and welding it in place to form billet 35, as seen in FIG. 5. Weld nugget 44 may be the result of any welding process one of ordinary skill in the art may be familiar with. The cap 40 may further contain a tube 45, as seen in FIG. 6, to facilitate gas purging and evacuation of the shell cavity. FIG. 7 depicts two billets 35 undergoing the purging step 140.

Figure 8A:
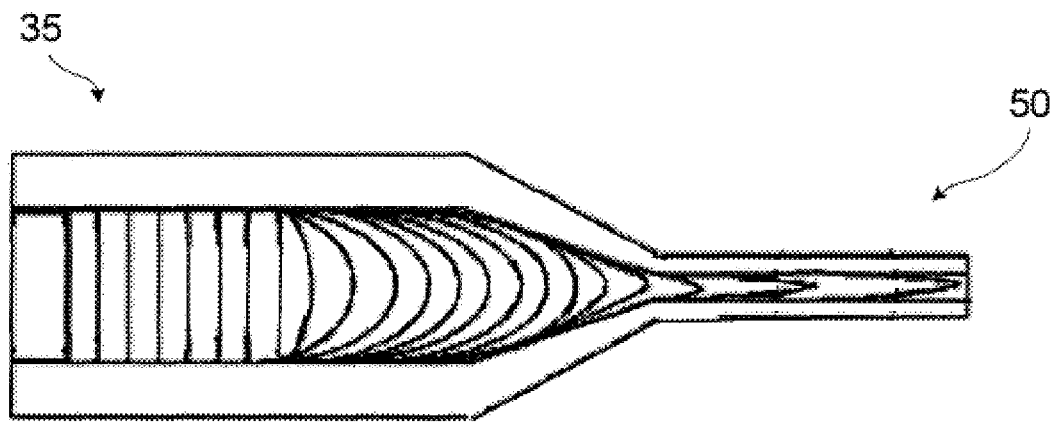
FIG. 8A is a schematic drawing of an extrusion process.
Figure 8B:
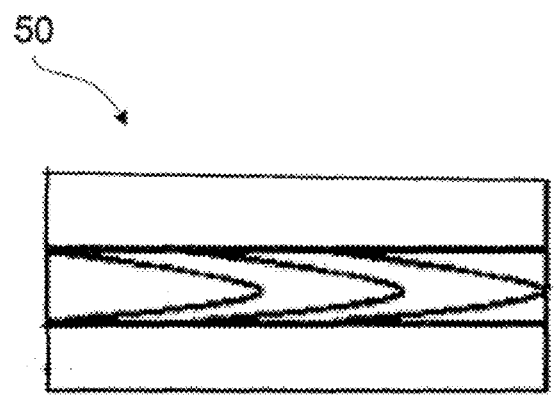
FIG. 8B is a detailed schematic drawing of an extruded rod.
Figure 9:
FIG. 9 is a photograph of a prototype of an extruded composite rod coil.
Figure 10:
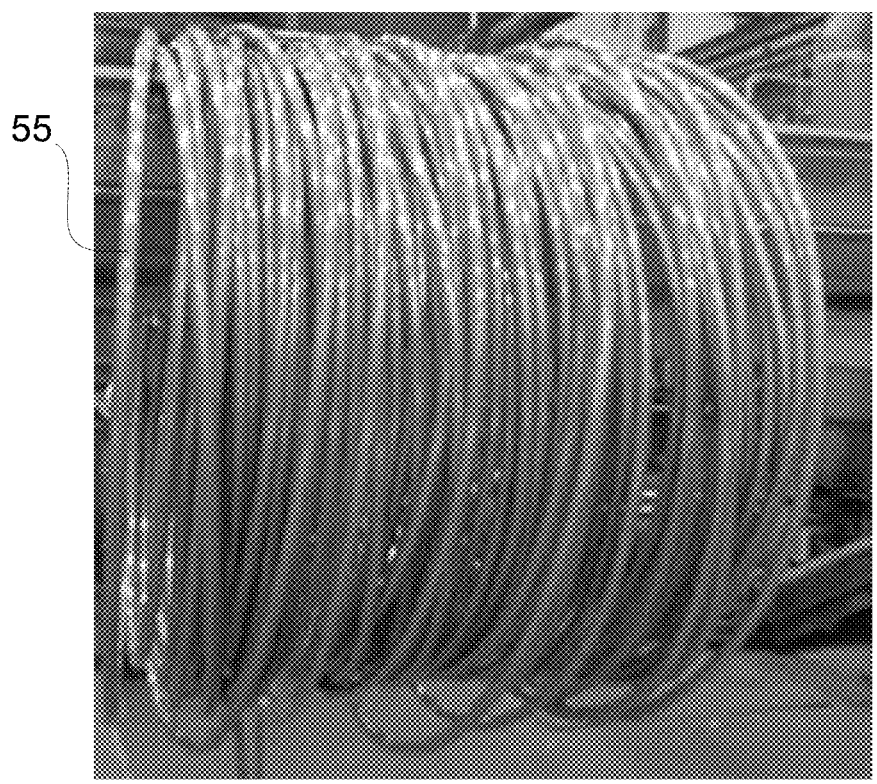
FIG. 10 is a photograph of a prototype of a composite wire.
Figure 11:
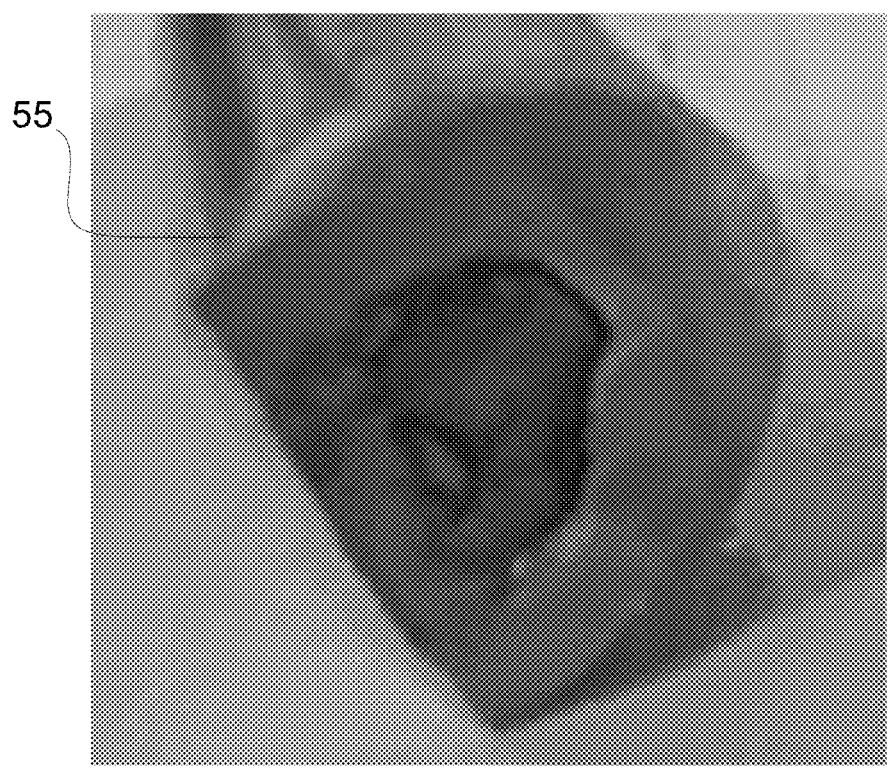
FIG. 11 is a photograph of a sheared end of a prototype composite wire.

The purging step 140 includes addition of the purging gas, which may be nitrogen, heating the billet above ambient temperature of the consecutive assembly, and evacuation of the purging gas. To prepare for extrusion 140, the billet 35 may be heated to a temperature above 900° C. In a specific embodiment, the billet 35 may be heated to a temperature of 960° C. The heated billet 35 may then be extruded 150 into a rod 50, as seen in FIG. 8A, and water quenched upon the exit of the extrusion die. Through extrusion 150, the interfaces between the compacted sub-assemblies 15 are completely bonded together, as well as the interface between the plurality of sub-assemblies 15 and the shell 25, as seen in FIG. 8B. An enhanced view of the extruded rod is shown in FIG. 9. Finally the extruded rod 50 is further drawn 160 to form a composite wire 55 having the desired diameter. Conventional drawing techniques may be used, which may involve multiple passes to achieve the desired diameter. If a precipitation hardened copper alloy is used in the assembly for the shell material, a heat treatment step may be necessary to harden and increase the conductivity of the shell material. The final composite wire coil 55 is shown in FIG. 10 and a sheared end of a composite wire is shown in FIG. 11.

The method of producing a DSC rod simplifies the production process and can be used to reduce the amount of DSC needed for the end product. All known current methods used to produce DSC rod start from either extruding granule/powder within a canister or extruding CIPed/HIPed billets. Instead, the present disclosure uses pre-compacted sub-assemblies from granules/powder that are stacked into a tubular shell and then extruded into rod.

The benefits to this method include: larger coil weights of extruded DSC rod due to using DSC powder that has been compacted to a density greater than 80% prior to extrusion and the ability to significantly increase the wall thickness of the outer shell to minimize the amount of DSC for specific products, including welding. Utilizing this method to manufacture a rod with significantly less DSC is the primary focus of this work and its relationship to resistance welding electrodes.

Figure 12:
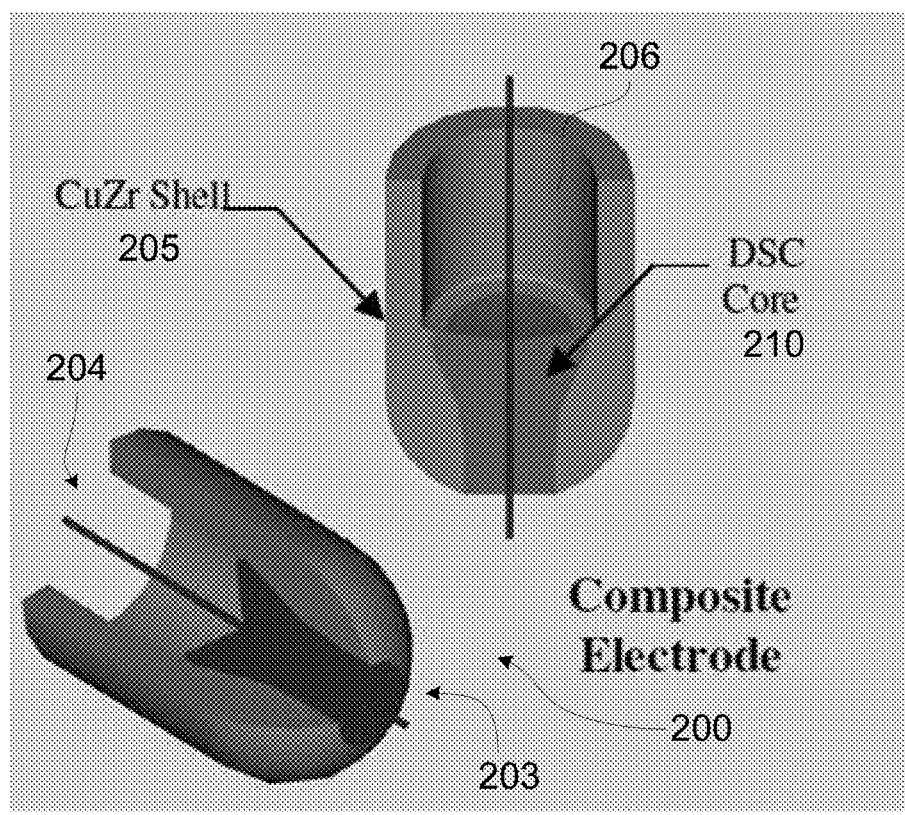
FIG. 12 is a schematic of a cross-sectional view of a composite electrode.
Figure 13:
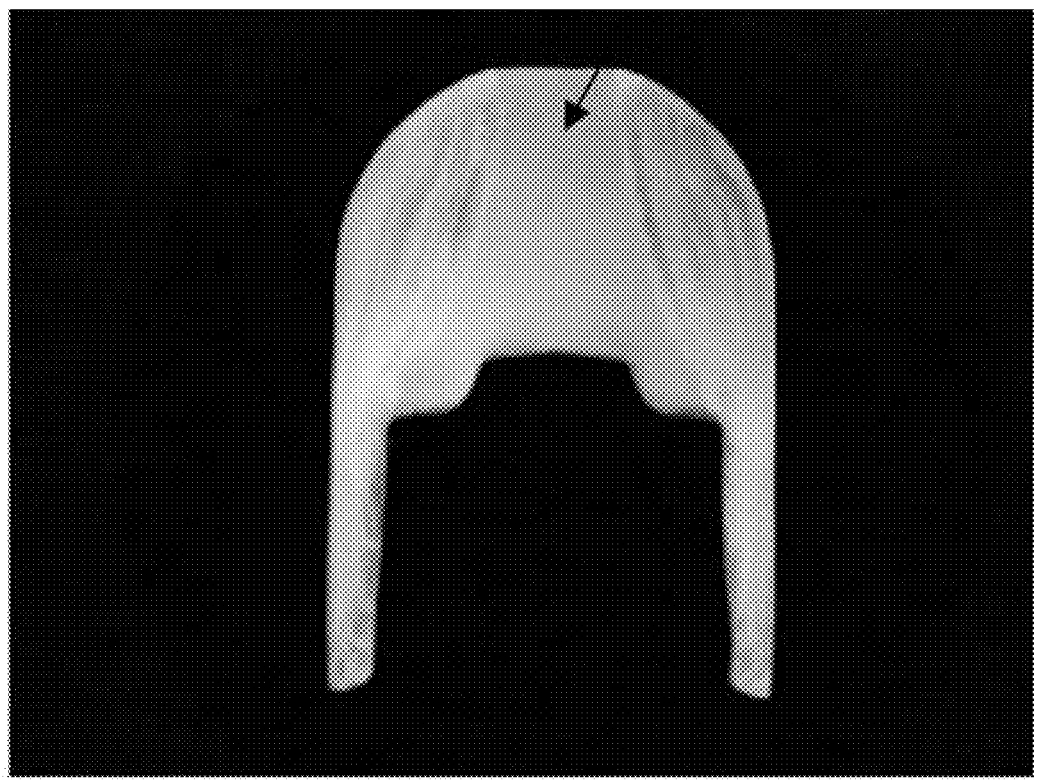
FIG. 13 is a photograph of a cross-sectional view of a prototype composite electrode.

Referring to FIGS. 12-13, the present disclosure describes a composite welding electrode 200. The electrode 200 comprises a composite body having a tip portion 203 and an end portion 204. The composite body of the electrode 200 includes a shell 205 defining a cavity 206 through the end portion 204. The shell 205 is comprised of a first metal that includes precipitation hardened copper alloy, copper alloy, or carbon steel. The shell 205 further comprises a core 210 within the shell 205, the core 210 extending through the shell 205 from the tip portion 203 to the cavity 206. The core 210 comprises a second metal that includes dispersion strengthened copper. The core 210 and shell 205 have a metallurgical bond formed from co-extrusion.

The diameter of the core 210 may be substantially uniform from the tip portion 203 of the electrode 200 or the majority of the length of the core 210 may have a diameter that is substantially uniform with a minority length of the diameter that tapers outwardly as the core 210 meets the cavity 206. The cavity 206 of the electrode 200 may be sized and configured to be received by a robotic welder. The cavity 206 may be tapered inwardly from the end portion 204 to the core 210. The tip portion 203 may have a cross-sectional shape of a truncated parabolic or elliptical curve. The core 210 has an axial length and the shell 205 has an axial length, where the axial length of the core 210 may be about half the axial length of the shell 205.

In one particular embodiment, the shell 205 can be made solely of CuZr and the core 210 made solely from dispersion strengthened copper. The core 210 may have a diameter that is 6-8 mm at the tip portion 203 of the body, or the diameter of the core 210 may be approximately 6-8 mm throughout the welding electrode 200. The shell 205 can have an outer diameter that is approximately 0.600-0.650 inches and an inner diameter that is approximately 0.420-0.480 inches, which forms an outer wall of the cavity 210. The core 210 may have a melting point of approximately 1083° C. (1981° F.); a hardness range of approximately 110-125 HV (60-70 HRB); an electrical conductivity of approximately 0.380 MegaSiemens/cm at 20° C. (83% IACS at 68° F.); and a density of approximately 8.83 gm/cm$^3$ at 20° C. (0.319 lb/in$^3$ at 68° F.). The shell 205 may have a melting range of approximately 980° C.-1080° C. (796° F.-1976° F.); a density of approximately 8.89 gm/cm3 at 20° C. (0.321 lb/in$^3$ at 68° F.); and a thermal conductivity of approximately 366.9 W/m·° K at 20° C. (212.0 Btu·ft/(hr·ft$^2$·° F.) at 68° F.). The shell 205 can have a hardness of approximately 120-155 HV (64-80 HRB); an electrical conductivity of approximately 0.544 MegaSiemens/cm at 20° C. (93% IACS at 68° F.); an electrical resistivity of approximately 1.86 microhm-cm at 20° C. (11.2 ohms-cmil/ft at 68° F.); a specific gravity of approximately 8.89; and a specific heat capacity of approximately 393.5 J/kg·° K at 293° K (0.092 Btu/lb/° F. at 68° F.).

Figure 14:
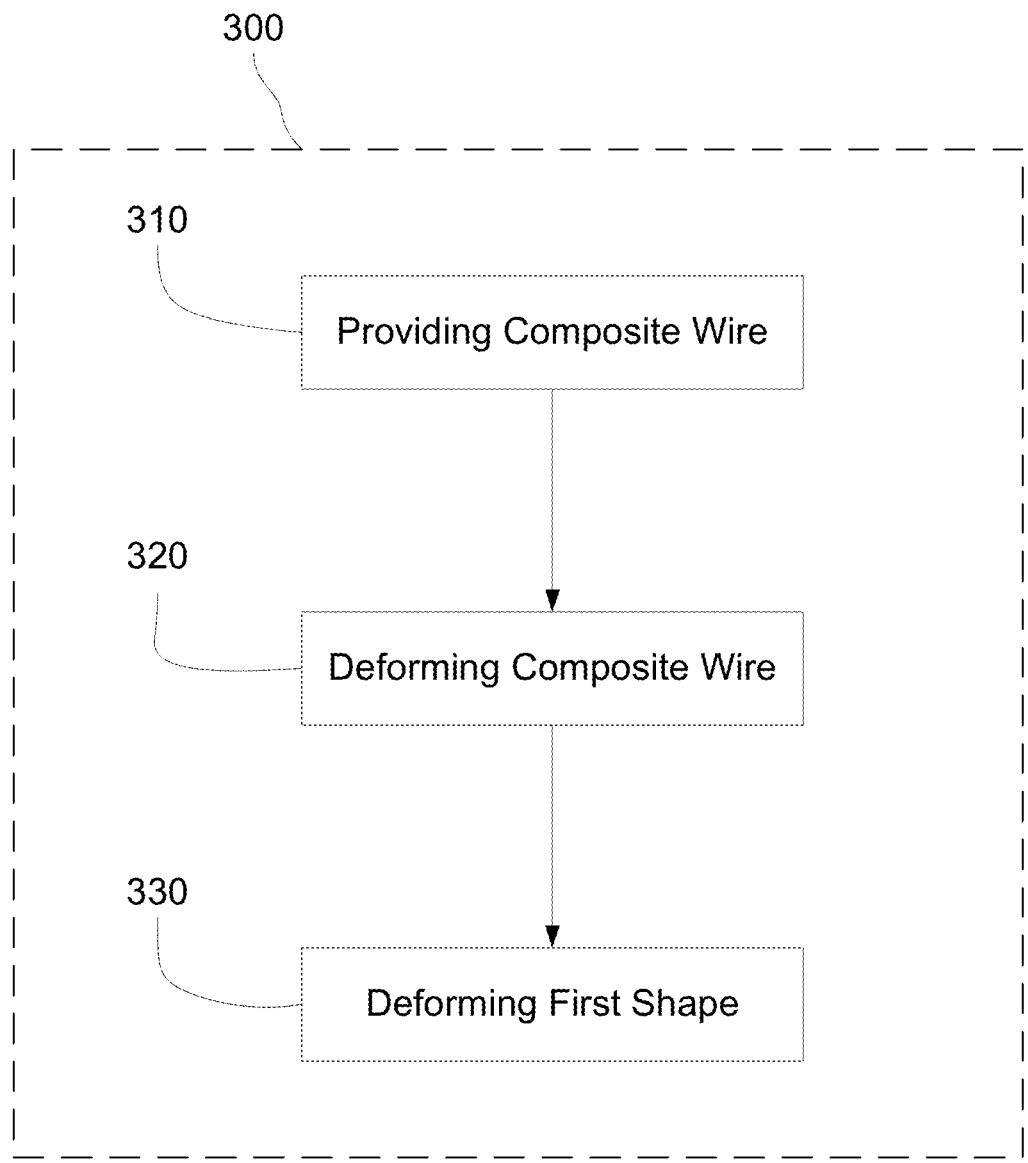
FIG. 14 a flow chart of method of producing a composite electrode.
Figure 15:
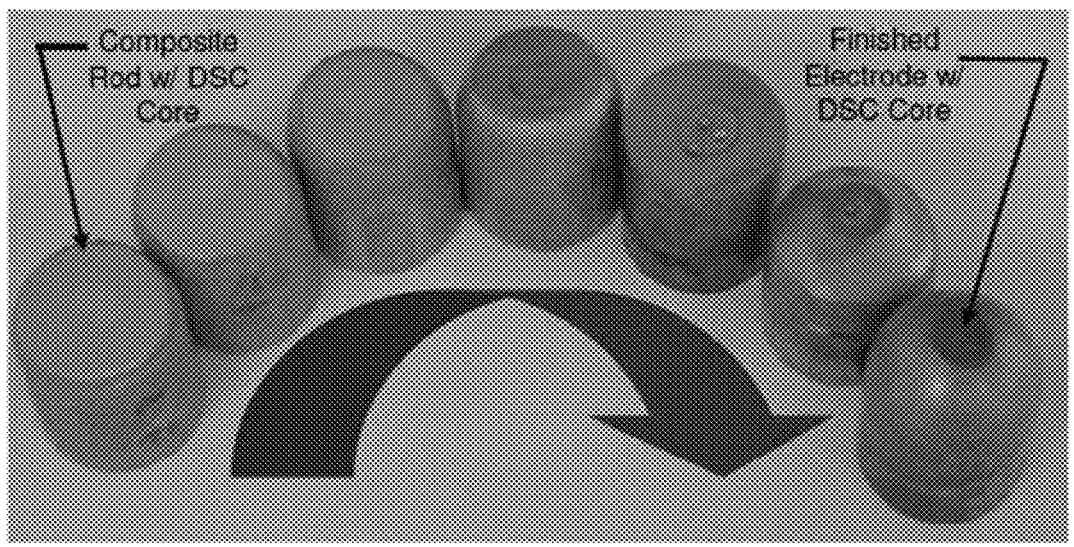
FIG. 15 is a photograph of prototype composite electrodes at various stages of deformation.

Referring to FIGS. 14-15, the present disclosure further comprises a method 300 of manufacturing a composite material. The method 300 includes providing 310 a composite metal wire having a first end and a second end, a core, and a shell surrounding the core where a metallurgical bond is formed between the shell and core from co-extrusion. In a specific embodiment, the composite metal wire is cylindrical and the core extends from the first end to the second end of the composite metal wire. The shell comprises precipitation hardened copper alloy or carbon steel and the core comprises dispersion strengthened copper. Furthermore, the shell may be made solely of CuZr and the core made be made solely from dispersion strengthened copper.

The composite wire can be deformed 320 into a first shape such that the first end forms as rounded tip having a truncation. The step of deforming 320 the wire into the first shape may lengthen the wire. Multiple deforming presses may be necessary to achieve the first shape.

The first shape is further deformed 330 into a second shape in which a cavity is formed in the second end. The deforming step 330 from the first shape to the second shape may involve pushing the core from the second end toward the first end. Multiple deforming presses may be necessary to achieve the second shape. The step of deforming 330 the wire from the first shape into the second shape may also lengthen the wire. In the second shape, the core may have an axial length and the shell has an axial length, where the axial length of the core may be about half the axial length of the shell.

Figure 16A:
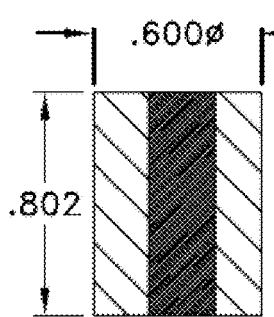
FIG. 16A-16F illustrate an exemplary deformation process.
Figure 16B:
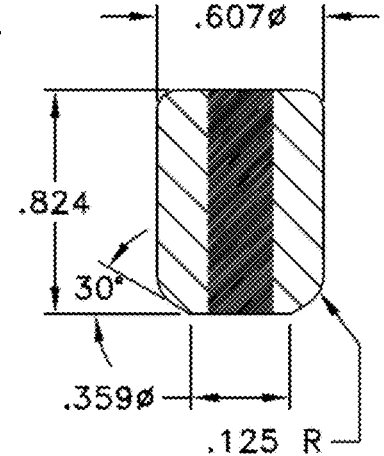
Figure 16C:
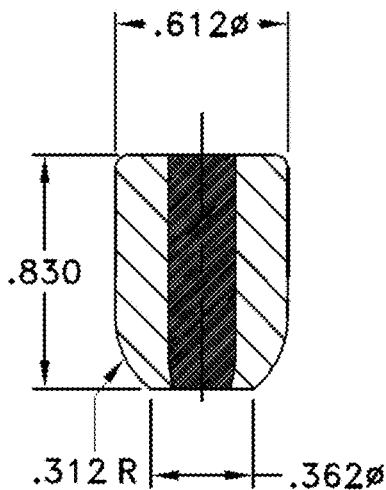
Figure 16D:
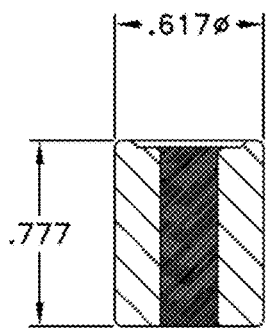
Figure 16E:
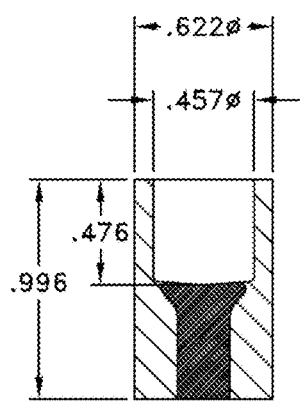
Figure 16F:
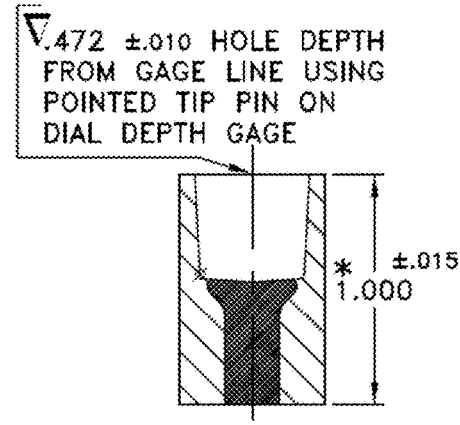

FIGS. 16A-16F show cross-sectional views of an exemplary composite wire undergoing an exemplary manufacturing method according to the present disclosure. Specifically, an initial composite wire, shown in FIG. 16A, is shown undergoing five successive deformation steps FIGS. 16B-16F, until a composite welding electrode is formed.

Benefits of the methods of manufacturing a composite material and the composite welding electrode described herein include: improved weld nugget stability due to a consistent diameter of core, extended welding electrode life due to lower expansion of the weld face of the electrode, improved electrical efficiencies by using alloys with higher electrical conductivities for the outer shell, improved electrode cooling by using alloys with higher thermal conductivities for the outer shell, and the ability to have an infinite range of core diameter to shell diameter ratios. The overall cost of welding can be reduced, while maintaining a high weld quality. The improved electrical efficiencies can reduce the weld currents used during a welding operation.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A welding electrode, comprising:
   a composite body having a tip portion and an end portion, the composite body including:
   a shell defining a cavity through the end portion, the shell comprising a first metal that includes one or more of the following: a precipitation hardened copper alloy, copper alloy, and carbon steel;
   a core within the shell, the core extending through the shell from the tip portion to the cavity, the core comprising a second metal that includes dispersion strengthened copper;
   wherein the core and the shell have a metallurgical bond formed from co-extrusion;
   wherein the core of the welding electrode has a diameter that increases distally from the tip portion toward the cavity.

2. The welding electrode of claim 1, wherein the shell is made solely from CuZr.

3. The welding electrode of claim 2, wherein the core is made solely from dispersion strengthened copper.

4. The welding electrode of claim 1, wherein the core has a diameter that is 6-8 mm at the tip portion of the body.

5. The welding electrode of claim 4, wherein the diameter of the core is approximately 6-8 mm throughout the welding electrode.

6. The welding electrode of claim 1, wherein the cavity is mated with a receiving end of a robotic welder.

7. The welding electrode of claim 1, wherein the tip portion has a cross-sectional shape of a truncated parabolic or elliptical curve.

8. The welding electrode of claim 1, wherein a majority length of the core has a diameter that is substantially uniform, and a minority length of the diameter tapers outwardly as the core meets the cavity.

9. The welding electrode of claim 1, wherein the core has an axial length, and the shell has an axial length, the axial length of the core being about half the axial length of the shell.

10. The welding electrode of claim 9, wherein the shell has an outer diameter that is approximately 0.600-0.650 inches and an inner diameter of approximately 0.420-0.480, which forms an outer wall of the cavity.

11. The welding electrode of claim 1, wherein the cavity tapers inwardly from the end portion to the core.

12. A method of manufacturing a composite material, comprising:
   providing a composite metal wire having a first end and a second end, the composite wire including a core and a shell surrounding the core, the core and the shell having a metallurgical bond formed from co-extrusion;
   deforming the wire into a first shape such that the first end forms a rounded tip having a truncation;
   deforming the wire from the first shape into a second shape such that a cavity is formed in the second end;
   wherein deforming the wire from the first shape into the second shape pushes the core from the second end toward the first end;
   wherein the shell comprises one of the following: a precipitation hardened copper alloy and carbon steel;
   wherein the core comprises dispersion strengthened copper;
   wherein the core has a diameter that increases from the rounded tip toward the cavity.

13. The method of claim 12, wherein the shell is made solely from CuZr.

14. The method of claim 13, wherein the core is made solely from dispersion strengthened copper.

15. The method of claim 12, wherein the composite metal wire is cylindrical, the core extending from the first end to the second end of the composite metal wire.

16. The method of claim 12, wherein deforming the wire into the first shape lengthens the wire.

17. The method of claim 12, wherein deforming the wire from the first shape into the second shape lengthens the wire.

18. The method of claim 12, wherein, in the second shape, the core has an axial length, and the shell has an axial length, the axial length of the core being about half the axial length of the shell.

19. The welding electrode of claim 1, wherein the composite body is formed by:
   compacting a copper alloy powder into a plurality of substantially uniform compressed sub-assemblies such that the copper alloy powder of the plurality of compressed sub-assemblies has a packing density that is greater than 50%;
   layering the plurality of compressed sub-assemblies relative one another within an aperture of a billet shell, the plurality of compressed sub-assemblies forming a consecutive assembly of compacted copper alloy;
   sealing the consecutive assembly within the billet shell to form a sealed billet; and
   hot extruding the sealed billet at a temperature above 900° C. into the composite body.

20. The method of claim 12, wherein the composite metal wire is formed by:
   compacting a copper alloy powder into a plurality of substantially uniform compressed sub-assemblies such that the copper alloy powder of the plurality of compressed sub-assemblies has a packing density that is greater than 50%;
   layering the plurality of compressed sub-assemblies relative one another within an aperture of a shell, the plurality of compressed sub-assemblies forming a consecutive assembly of compacted copper alloy;
   sealing the consecutive assembly within the shell to form a billet; and
   hot extruding the billet at a temperature above 900° C. into the composite metal wire.

* * * * *